(12) United States Patent
Homer (10) Patent No.: US 9,747,752 B2
(45) Date of Patent: Aug. 29, 2017

(54) METHOD OF AND DEVICE FOR GENERATING TRUE RANDOM NUMBERS AND A GAMING SYSTEM

(71) Applicant: NOVOMATIC AG, Gumpoldskirchen (AT)

(72) Inventor: Alois Homer, Gumpoldskirchen (AT)

(73) Assignee: NOVOMATIC AG, Gumpoldskirchen (AT)

( * ) Notice: Subject to any disclaimer, the term of this patent is extended or adjusted under 35 U.S.C. 154(b) by 308 days.

(21) Appl. No.: 14/356,401

(22) PCT Filed: Nov. 9, 2012

(86) PCT No.: PCT/EP2012/072297
§ 371 (c)(1),
(2) Date: May 6, 2014

(87) PCT Pub. No.: WO2013/068546
PCT Pub. Date: May 16, 2013

(65) Prior Publication Data
US 2014/0287816 A1    Sep. 25, 2014

(30) Foreign Application Priority Data
Nov. 9, 2011    (EP) ..................................... 11008930

(51) Int. Cl.
*A63F 9/00* (2006.01)
*G07F 17/32* (2006.01)
*G06F 7/58* (2006.01)

(52) U.S. Cl.
CPC ............ *G07F 17/326* (2013.01); *G06F 7/588* (2013.01); *G06F 2207/58* (2013.01)

(58) Field of Classification Search
None
See application file for complete search history.

(56) References Cited

U.S. PATENT DOCUMENTS 4,805,907 A    2/1989  Hagiwara
5,533,727 A    7/1996  DeMar
(Continued)

FOREIGN PATENT DOCUMENTS

EP    1993080    11/2008
GB    2352087    1/2001
(Continued)

OTHER PUBLICATIONS

Jon Von Neumann., Applied Mathematics Series 1951, vol. 12, p. 36-38, "Various techniques used in connection with random digits".
(Continued)

*Primary Examiner* — Seng H Lim
(74) *Attorney, Agent, or Firm* — Brooks Kushman P.C.

(57) ABSTRACT

A device for generating true random numbers by way of a quantum optic process, the device having a light source for generating at least one single-photon within a light beam; and at least two detectors each for detecting single-photons within the beam thereby providing detector signals; and control means provided and adapted to control generation of a series of single photons and to register the detector signals for generating the true random number values; wherein the detectors for detecting single-photons each including at least one quantum dot; and wherein the detectors are positioned at substantially equivalent spatial position of detection probability of single-photons in the beam.

11 Claims, 4 Drawing Sheets

(56) References Cited

U.S. PATENT DOCUMENTS

| | | | |
|---|---|---|---|
| 5,689,587 A | 11/1997 | Bender et al. | |
| 6,249,009 B1 | 6/2001 | Kim et al. | |
| 6,419,583 B1 | 7/2002 | Crumby et al. | |
| 6,533,664 B1 | 3/2003 | Crumby | |
| 6,539,410 B1* | 3/2003 | Klass | G06F 7/588 708/255 |
| 7,199,372 B2 | 4/2007 | Kardynal et al. | |
| 7,492,901 B2 | 2/2009 | Takemoto et al. | |
| 2002/0090986 A1 | 7/2002 | Cote et al. | |
| 2004/0137987 A1 | 7/2004 | Nguyen et al. | |
| 2004/0166923 A1 | 8/2004 | Michaelson et al. | |
| 2004/0176167 A1 | 9/2004 | Michaelson et al. | |
| 2004/0235551 A1 | 11/2004 | Walker et al. | |
| 2006/0115086 A1 | 6/2006 | Beausoleil et al. | |
| 2006/0234791 A1 | 10/2006 | Nguyen et al. | |
| 2007/0127718 A1* | 6/2007 | Ribordy | G06F 7/588 380/256 |
| 2007/0260658 A1* | 11/2007 | Fiorentino | B82Y 10/00 708/250 |
| 2008/0076525 A1* | 3/2008 | Kim | G07C 15/006 463/22 |
| 2009/0093300 A1 | 4/2009 | Lutnick et al. | |
| 2009/0258693 A1 | 10/2009 | Preston et al. | |
| 2009/0292785 A1 | 11/2009 | Leedberg et al. | |
| 2010/0122320 A1 | 5/2010 | Merati et al. | |
| 2011/0223991 A1 | 9/2011 | Powell et al. | |

FOREIGN PATENT DOCUMENTS

| | | |
|---|---|---|
| WO | 9926204 | 5/1999 |
| WO | 0016182 | 3/2000 |
| WO | 2006031693 | 3/2006 |
| WO | 2007124089 | 11/2007 |

OTHER PUBLICATIONS

European Search Report for European Application No. EP 11008930, Completed by the European Patent Office on Feb. 27, 2012, 7 Pages.

International Search Report for PCT/EP2012/072297, Completed by the European Patent Office on Nov. 23, 2012, 4 Pages.

Website http://en.wikipedia.org/w/index.php?title=Random_seed&oldid=434790363 Retrieved from Wikipedia on Jan. 10, 2015, XP 055217611, 2 Pages, "Random seed".

* cited by examiner

METHOD OF AND DEVICE FOR GENERATING TRUE RANDOM NUMBERS AND A GAMING SYSTEM

CROSS-REFERENCE TO RELATED APPLICATION

This application is the U.S. national phase of PCT Application No. PCT/EP2012/072297 filed on Nov. 9, 2012, which claims priority to European Patent Application No. 11008930.7 filed on Nov. 9, 2011, the disclosures of which are incorporated in their entirety by reference herein.

FIELD OF THE INVENTION

This invention relates generally to the field of random number generation, and more particularly to a method of and device for generating true random numbers based on a quantum optics process. Even more particularly, the present invention relates to the generation of true random numbers using quantum mechanics for gaming systems.

BACKGROUND OF THE INVENTION

Random numbers are supremely important in many applications. In cryptography, for example, they are needed respectively used for generation of cryptographic keys or the initialization of certain variables in cryptographic protocols. They also find applications in various others fields such as numerical simulations and statistics.

In the gaming industry, current gaming machines utilize pseudo random number generators to determine wagering and bonus outcomes. The pseudo random number generator utilizes a deterministic mathematical algorithm that generates a sequence of "seemingly" random numbers. However, as the term "pseudo" implies, the sequence of numbers generated by the pseudo random number generator is not random at all. Pseudo random numbers are generated using an arithmetical algorithm having an output of numbers that can pass most statistical tests of randomness. These algorithms take as input an initialization parameter known as a seed and iteratively produce numbers. However, it is entirely deterministic and eventually repeats itself. Given the variable that determines the sequence, the numbers are (subject to more or less effort) predictable which cause the wagering outcomes of a wager based game to be predictable as well, which may also cause the system to be vulnerable against criminal attacks.

Lottery and gaming industry regulations require that random numbers that are used for playing games of chance pass certain minimum statistical randomness tests to ensure fairness and unauthorized tampering of the random numbers. The regulations also require the auditing of used random numbers; a casino must be able to verify that the sequence of random numbers, which resulted in a large jackpot, originated from an authorized random number generator belonging to the casino or lottery operator.

True random number generators are devices exploiting a physical process to produce true random numbers. Numerous physical processes can be used as a source of randomness for generating true random numbers.

Randomness is embedded within quantum physics at a fundamental level. Consequently, it makes sense to use a process described by quantum physics as a source of randomness for the generation of true random numbers.

U.S. Pat. No. 6,249,009 discloses a true random number generator which utilizes quantum mechanics having a laser, neutral density filter, and a single photomultiplier tube that detects photons. Other embodiments of a true random number generator may have a laser, neutral density filter, beam splitter, and two photomultiplier tubes that each detects a single photon from the beam splitter.

What is needed is the use of an improved quantum optics process as the basis for the generation of true random numbers. Further, what is needed is a simple and practical true random number generator based on a quantum optics process.

OBJECT AND SUMMARY OF THE INVENTION

It is an object of the invention to provide a device and method of the type mentioned in the first paragraph, which obviate the drawbacks described above.

To achieve the object described above, characteristic features according to the invention are provided with a device according to the invention so that a device according to the invention can be characterized as follows:

A device for generating true random numbers by way of a quantum optic process, the device comprising: a light source for generating at least one single-photon within a light beam; and at least two detectors each for detecting single-photons within the beam thereby providing detector signals; and control means; wherein the detectors for detecting single-photons each comprises at least one quantum dot; and wherein the detectors are positioned at substantially equivalent spatial position of detection probability of single-photons in the beam; and wherein the control means are provided and adapted to control generation of a series of single photons and to register the detector signals for generating the true random numbers.

The provision of the characteristic features according to the invention creates the advantages that in particular, by avoiding the avalanche process and its associated problems, the generation of random numbers is less prone to dark count noise, particularly when operated at high frequencies. Furthermore, as the detector is based upon a transistor, the building block of high-speed electronic circuitry may have a fast time response. Another advantage is that the quantum dot detector is able to be operated at low operating voltages (for instance less than 5 Volt) and is more robust. It is also suitable for fabrication into a multichannel array of detectors.

In contrast to random number generators based on solid-state single-photon detectors focused on Geiger mode avalanche photo detectors the system according to the present invention avoids inherent drawbacks in the avalanche process that hinder realization of reliable and fast quantum random number generators. Some of these inherent physical limitations are: Material Limitations: Almost all compound semiconductors that can provide longer wavelength detectors have a low ionization ratio, and subsequently a poor performance. High Tunneling and Generation Rates: High electric field leads to a high tunneling rate, even in the wide band-gap material, and tunneling current becomes the main source of the dark counts in modern avalanche photon detectors. Also, the fully depleted avalanche region produces the maximum Shockley-Read-Hall generation noise. Poor Uniformity: A fraction of a percent variation in doping or layer thickness can result in significant shifts in gain, dark current, breakdown voltage, and frequency response. Temperature and bias variations would prevent realization of a uniform large-area 2D array. High Photon Emission: The energetic (hot) carriers that are required for avalanche process can also produce photons. In fact, avalanche based detectors are known to produce "photon flashes" that are three to four orders of magnitude brighter than the incoming beam. The produced photons can severely interfere with the other components of the system in a single element single photon detector, and produce a significant crosstalk in an arrayed single photon detector.

To achieve the object defined above, characteristic features according to the invention are provided with a method according to the invention, so that a method according to the invention can be characterized as follows:

A method for generating a random number, comprising the method steps, providing an array of at least two detectors and illuminating it by a light beam comprising a single-photon; and detecting the single-photon using the least two detectors of the array each detector having a quantum dot and being associated with values; and generating the random number based on the values associated with the detector detecting the single-photon.

These and other aspects of the invention are apparent from and will be elucidated with reference to the embodiments described hereinafter.

BRIEF DESCRIPTION OF THE DRAWINGS

The invention will be described in greater detail hereinafter, by way of non-limiting example, with reference to the embodiments shown in the drawings.

DESCRIPTION OF EMBODIMENTS

Figure 1:
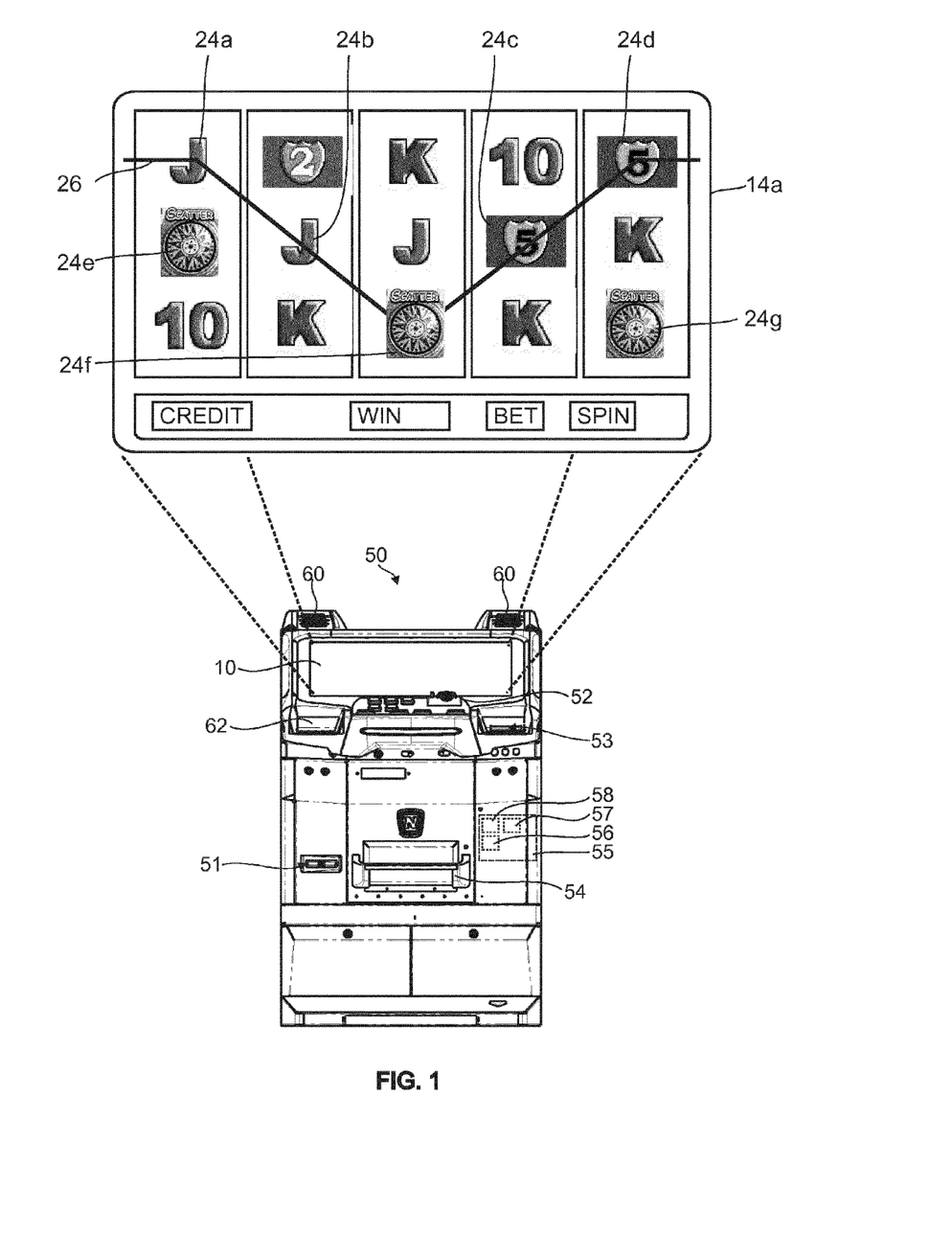
FIG. 1 shows a gaming machine.

FIG. 1 shows gaming machine 50 having a terminal window 10 to show a display 14a of a reel game. The gaming machine 50 is capable of various game play modes. Initially the gaming machine 50 operates in standard game play mode until the occurrence of a random event, and then the gaming machine 50 may operate in a feature game play mode. In standard game play mode a matrix of symbols is displayed in a format including five reels oriented in columns and three horizontal rows. The reels in one embodiment are physical reels that spin, and in another embodiment, the reels are images of physical reels.

The display 14a is configured to display a matrix of symbols 26 that imitate mechanical slot machine reels in standard game play mode according to one aspect of the invention. Accordingly, each column of the matrix of symbols imitates a single mechanical slot machine reel. The terminal window 10 is angled with respect to the floor to face a user.

In another embodiment of the invention, the display 14a includes mechanical slot machine reels. It can be appreciated that hybrid arrangements having both digital and mechanical components are contemplated herein. The display 14b is transmissive to facilitate highlighting of any of the various symbols, and paylines to facilitate game play.

The matrix of symbols 26 has three rows and five columns. The matrix of symbols 26, however, may include any number of rows and columns in accordance with various game formats. As shown, the matrix of symbols 26 includes a plurality of symbols 24a, 24b, 24c and 24d, and three scatter symbols 24e, 24f and 24g.

The gaming machine 50 includes hardware and peripheral devices necessary for operating the gaming machine. Peripheral devices in the present embodiment comprise: a printer 51, a chip tray 52, a bill acceptor 53, a secure cashbox 54, card reader device 62, and speakers 60.

The gaming machine 50 includes a mainboard 55 comprising a central processor 56, electronic memory 57 for storing processor instructions, and a hard disc drive 58 for storing software. The memory 57 and the hard disc drive are adapted to communicate with the central processor 56.

The bill acceptor 53 is adapted to receive currency and to deliver currency to the secure cashbox 54. The card reader 62 reads currency cards including smart cards, credit cards, debit cards, and the like. The card reader 62 and the bill acceptor 53 communicate financial transactions to the processor 56. Both the terminal window 10 and the speakers 60 communicate instructions and results to a player (user).

The card reader 62 is positioned near the terminal window 10 for convenient use to enable a user to use the card reader 62 when he is sitting or standing.

The terminal window 10 preferably is a touch screen monitor having four basic components, which include a touch sensor, a monitor (display), a controller and a software driver. The touch sensor is, for instance, based on Capacitive, Resistive, Surface Acoustic Wave (SAW)/Grounded Acoustic Wave (GAW) or similar technologies. The monitor, for instance, is based on Cathode Ray Tube (CRT), Liquid Crystal Display (LCD), plasma or similar technologies having a display screen on which the sensor can be fitted. The controller receives inputs from the touch sensor and performs functions in response to the central processor 56. The software driver allows the controller and central processor 56 to communicate and allows the controller to recognize input detected by the touch sensor.

The central processor 56 and mainboard 55 preferably are part of a general purpose computer having a video display unit with video Input/Outputs (I/O) to the video interface of the touch screen monitor, at least one audio output unit with audio I/O to an audio speaker 60a, a computer operating system e.g. Windows™, Linux™, Unix™ or the like, software drivers for all I/O peripherals, and serial/parallel ports and/or USB for connection to peripherals such as a printer, smartcard reader device, and Data I/O interfaces and Data I/O converters/splitters, where necessary.

A computer software program is stored in the hard disc drive 58, or other comparable memory storage unit. The program may organize display of all game components in a Graphical User Interface (GUI) on the touch screen monitor. The program may filter out relevant data for action, interpret the meaning of the data (after data conversion if necessary) sometimes with considerations from a previous event, present state or a predicted event, and act on the result of the interpretation. The data may come from I/O interfaces of all the devices/equipment connected to the program. Take the example of determining the position of a player's touch on a spot in the space of a graphic component on one of the touch screen monitor. A co-ordinate corresponding to each of the touch spots may be converted into a string of binary data by the controller of the touch screen. The data may then be transferred through serial connections from the controller to the central processor. The central processor may extract the data, read the co-ordinates and act out the action associated with the touch spot.

Figure 2:
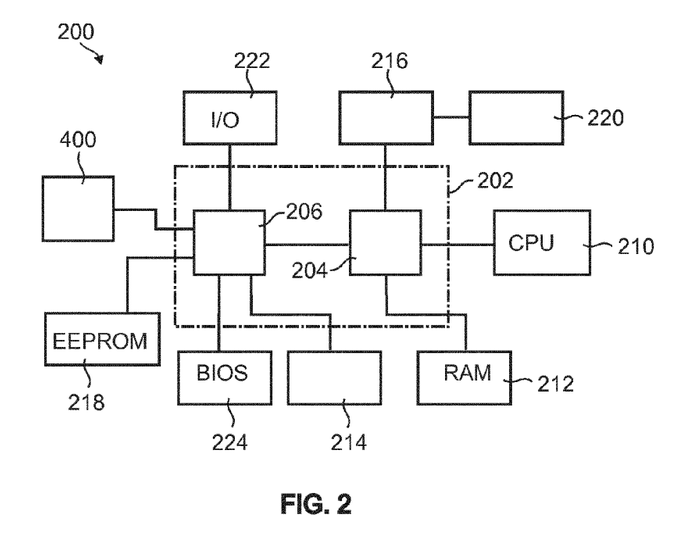
FIG. 2 shows a block diagram of the components in a true random number generating device for use in a gaming machine device according to another example of embodiment of the invention.

FIG. 2 is a block diagram of the components of a gaming machine and a true random number generating device used therein in accordance with an embodiment of the present invention. The core chipset 202 may control communications between the components of the device. The core chipset 202 may have a memory controller hub (MCH) or north bridge 204 and an input/output (I/O) controller hub (ICH) or south bridge 206. The core chip set 202 may combine all the features of the ICH with an accelerator graphic port (AGP) port and connect directly to the processor. The functions of a core chip set 202 and the north 204 and south bridges 206 are known in the art and will not be discussed in detail herein. Although the figures illustrate specific components coupled to the core chip set 202, they are exemplary components for one embodiment of the invention and not intended to be limiting as other components may be utilized.

Figure 4:
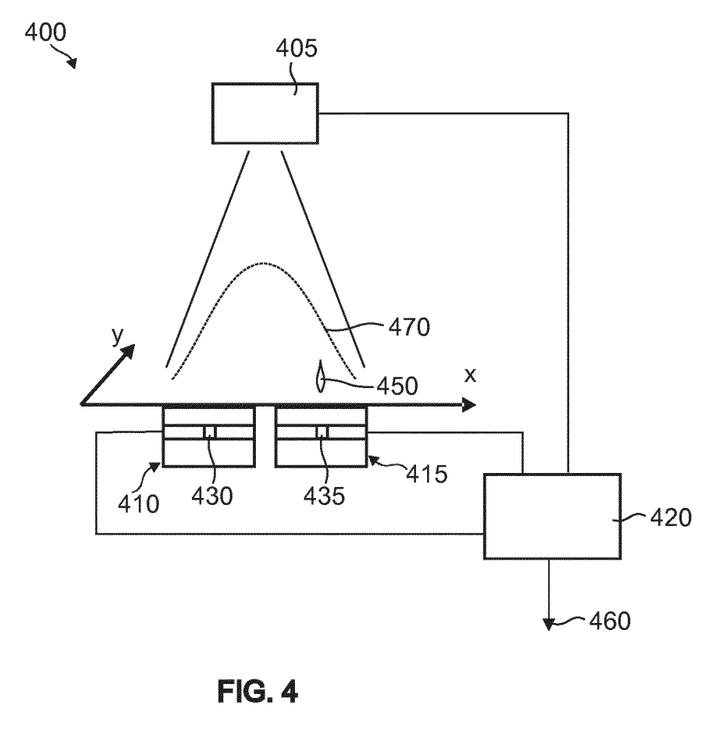
FIG. 4 shows a device for generating true random numbers by way of a quantum optic process according to an exemplary embodiment of the invention.

A true random number generator 400 according to the present invention shown in FIG. 4 in more detail is coupled to the processor 210 through the core chipset 202 at the south bridge 206. The true random number generator 400 may generate for instance 600 kilobits of true random numbers per second. A random-access memory (RAM) 212 may be coupled to the processor 210 through the core chipset 202 at the north bridge 204 to store and process the true random numbers generated by the true random number generator 400. The true random true numbers may be stored in the RAM 212 and processed by the processor 210. Processing the true random numbers may entail verifying the hardware integrity of the random number generator 400, remove biases, testing the randomness, approving, digitally signing, digitally verifying, encrypting, decrypting, and/or auditing the random numbers, as will be discussed in detail below. Once processed, the random numbers may be stored in the RAM 212.

The device 200 may also have a random number storage device 214 coupled to the processor 210 through the core chipset 202 at the south bridge 206. The random number storage device 214, instead of the RAM 212, may be used to store the true random numbers. The random number storage device 214 may be a mass storage device, such as a hard disk drive or flash drive, used in a general purpose computer that typically allows code and data to be read from and written to the mass storage device. However, in a gaming machine environment, modification of the gaming code stored on a mass storage device is strictly controlled and would only be allowed under specific maintenance type events with electronic and physical enablers required. Though this level of security could be provided by software, gaming computers that include mass storage devices preferably include hardware level mass storage data protection circuitry that operates at the circuit level to monitor attempts to modify data on the mass storage device and will generate both software and hardware error triggers should a data modification be attempted without the proper electronic and physical enablers being present.

A video controller or display adapter 216, such as a graphics or video card, may be coupled to a display 220 and the processor 210 through the core chipset 202 at the north bridge 204. The display adapter 216 may allow messages from the processor 210 to be displayed on the display 220. In one embodiment, the display adapter 216 may be integrated within the north bridge 204. The display 220 may be any type of display, for example, a liquid crystal display (LCD), fluorescent display, cathode ray tube (CRT) screen, and the like. This allows the device to display internal errors or successes originating from the device's own hardware and/or software. For example, if the true random number generator 400 fails, an error message informing the user of the failure will be displayed. Additionally, if an action was successful, such as the validation of a sequence of random numbers against a claimed jackpot, a "validation success" message may be displayed on the display 220. Other information such as the date and time the random numbers were generated and/or transmitted, the unique identification of the remote gaming device that the true random numbers were transmitted to, and any other information may also be displayed.

It will now be known that the device 200 need not have a display 220 and/or display adaptor 216. Rather, in another embodiment, the device 200 may display messages on a remote gaming server, such as the remote gaming server display. The messages may be transmitted through the I/O interface 222. A console application in the remote gaming server may communicate with the processor 210 through the I/O interface 222 and monitor messages sent to the remote gaming server from the processor 210.

As discussed above, to communicate with the remote gaming server, an I/O interface 222 may be used. The I/O interface 222 may also be coupled to the processor 210 through the core chipset 202 at the south bridge 206 to receive requests and transmit data to a remote gaming device. The I/O interface 222 may be any type of interface such as a wireless transceiver, universal serial bus (USB), peripheral component interconnect (PCI), network card, data bus, or any other type of interface that allows the true random number generating device 200 to communicate with the remote gaming server. The remote gaming server may be, but is not limited to, a personal computer, slot machine, remote gaming device, portable gaming device such as but not limited to a cell phone, a personal digital assistant, and a wireless game player, or any other gaming machine. The I/O interface 222 may also connect to other I/O devices such as a keyboard, set of buttons, or a mouse to allow a player to play a game of chance on a gaming machine.

The device may also have a read only memory (ROM) such as an electrically erasable programmable read-only memory 218 (EEPROM) to store an operating system and at least one software program to run a game of chance and/or process the random numbers. The operating system and software are typically stored in a non-volatile read/write mass storage device; however, use of an EEPROM 218 ensures the integrity of the device 200. The EEPROM 218 ensures the integrity of the device by allowing a user to easily verify that the contents of the device are authentic if tampering of the device is suspected. For example, the software in the EEPROM 218 may ensure the integrity of the data in the random number storage 214 by allowing only authorized software processes with valid digital signatures to read, write, modify, and delete data in the random number storage 214. If tampering of software in the EEPROM 218 is suspected, the user may simply remove the EEPROM 218 from the device 200 and verify the contents. Thus, since the device 200 is secured in an enclosure, as further discussed below, tampering may be visible only if, for example, the tamperproof tape is compromised.

A read-only basic input output system 224 (BIOS) may be used to perform a self test on all the hardware/software in the device once it is powered on. Should a component fail the self test, a message may be displayed on the display 220 to inform the user of the failure.

It will now be known that the operating system and/or software program may be stored on any other component. For example, when the device 200 is powered on, before executing any software, the EEPROM 218 may contain software that verifies the digital signature of the software programs, including the operating system, which may then be stored in a mass storage device. In another embodiment, the BIOS 224 may be used to store the operating system and software programs.

A voltage current regulator may be coupled to the true random number generator 400 and the processor 210 through the core chipset 202 to maintain and monitor the power supplied to the true random number generator 400. This ensures the integrity of the true random number generator 400.

According to an exemplary embodiment the I/O device is a set of buttons.

As a further embodiment or in addition the I/O device is a touch screen display.

As a further embodiment or in addition the I/O device is a mechanical wheel.

According to an exemplary embodiment the non-volatile memory is an EEPROM.

According to an exemplary embodiment the I/O interface is one of the group of a wireless transceiver, a network card, a universal serial bus (USB), a peripheral component interconnect (PCI) bus, or a combination thereof.

According to an exemplary embodiment a basic input output system (BIOS) is provided and coupled to the processor to perform a self test of the device.

According to an exemplary embodiment at least one door, lock, sensor, evidence tape, and combinations thereof are provided to secure the device.

According to an exemplary embodiment the memory is a random access memory (RAM).

According to an exemplary embodiment a read only memory (ROM) is coupled to the processor to store at least one software program.

According to an exemplary embodiment the read-only memory is a programmable read-only memory (PROM).

According to an exemplary embodiment the read-only memory is an electronically erasable programmable read-only memory (EEPROM).

According to an exemplary embodiment the memory is a non-volatile memory to store an operating system and at least one software program.

Figure 3:
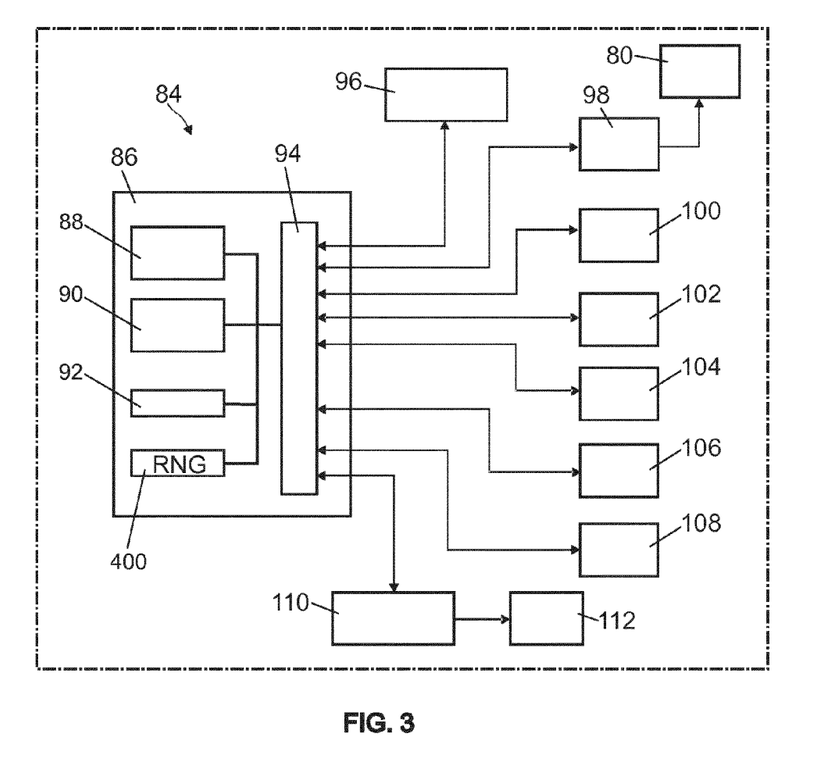
FIG. 3 is a block circuit diagram of a device according to yet another example of embodiment of the invention.

FIG. 3 shows a system diagram of a computer 84 used in a gaming machine according to another exemplary embodiment of the invention. The computer 84 includes a main board 86, program memory 88 being a computer readable medium, a main processor 90 and RAM 92 connected in operative communication. The computer 84 has an input output I/O controller 94. The I/O controller 94 communicates with a user interface control panel 96, display interface driver circuitry 98, a display unit 100, a coin acceptor 102, a bill acceptor 104, a card reader 106, a ticket reader/printer 108, and a sound circuit 110. The sound circuit 110 is in operative communication with speakers 112.

A true random number generator 400 according to the present invention shown in FIG. 4 in more detail is operatively coupled to the main processor 90 and RAM 92.

The coin acceptor 102 and the bill acceptor 104 accept currency and communicate the amount accepted to the I/O controller 94. The card reader 106 reads credit cards, debit cards, gift cards or other card having electronic indicia of monetary value.

The ticket reader 108 prints tickets and receipts revealing the winnings of a player, or other financial outcome. The ticket reader 108 also receives tickets having indicia of monetary value, such as a bar code, which is read by the ticket reader 108.

The sound circuit 110 is configured to provide an acoustic-based interface for the user. Each movement or action by a user may result in a particular sound, or instruction being generated by the computer 84. The speakers 112 communicate the sounds to the user.

FIG. 4 shows a device 400 for generating true random numbers by way of a quantum optic process, the device 400 comprising: a light source 405 for generating at least one single-photon within a light beam; and at least two detectors 410, 415 each for detecting single-photons 450 within the beam thereby providing detector signals; and control means 420, wherein the detectors 410, 415 for detecting single-photons each comprises at least one quantum dot 430, 435; and wherein the detectors are positioned at substantially equivalent but spatial different position of detection probability 470 of single-photons in the beam; and wherein the control means 420 are provided and adapted to control generation of a series of single photons and to register the detector signals for generating the true random numbers 460.

The apparatus is made up of a light source of photons, which produces a beam of photons. The beam illuminates an array of at least two single-photon detectors. A value is associated with each detector of this array. The detection of a photon in a given detector will yield one random number, whose value will be that associated with the detector.

If the detector array is made up of two single-photon detectors, the apparatus will produce random binary numbers. One detector will be associated with a value of "0" and the other detector with a value of "1".

The randomness of the true random number produced in this way stems from the wave-particle duality of the photons. The position of a photon in the beam is described by a wavefunction. This function can be used to calculate the spatial detection probability of a photon in the beam. If several single-photon detectors are placed on a plane perpendicular to the beam, their respective photon detection probability will be related to the value taken by the wavefunction at their location.

In this regard, the term "photon" means a unit of electromagnetic energy irrespective of its position in the spectrum, e.g. visible or invisible radiation.

A method according to an exemplary embodiment of the invention may include the following steps. In a first step, an array of detectors is illuminated by a light beam comprising a single-photon. In a second step, the single-photon is detected or not using at least two detectors of the array each detector having a quantum dot. In a third step, the detection is associated with values. In a fourth step, the detected values generate random numbers values equal to that associated with the detector. In a fifth step, the above three steps are repeated to produce sequences of true random numbers. In a sixth step, using control circuitry means, random numbers associated with the detections are registered in a format suitable for interfacing with a computer or another device. The device can comprise a buffer.

In an optional seventh step, the sequences so generated are processed to remove a possible bias, to produce numbers in a different dimension, or to tailor the probability distribution. In an optional eighth step, the sequences of random numbers so generated are queued for randomized distribution to recipients as seeds or as cryptography keys, in a secure manner.

The value associated with each detector may be determined using a wave function which describes the position of a photon in the beam. Then, the spatial detection probability of a photon in the beam is calculated. If several single-photon detectors are placed on a plane perpendicular to the beam, their respective photon detection probability is related to a value taken from the wavefunction at their location.

The sequence may optionally subsequently be processed, for example, to remove a possible bias, to produce numbers in a different dimension, or to tailor the probability distribution 36, in a way, for example, as described by J. von Neumann, "Various techniques used in connection with random digits", Applied Mathematics Series, 12, 36-38, U.S. National Bureau of Standards (1951), the content of which is incorporated herein by reference hereto.

In another embodiment of the invention, detection of a single-photon in detector 410 respectively quantum dot 430 will produce a true random number of binary value "0", for example, while detection of a photon in detector 415 respectively quantum dot 435 will produce on of binary value "1".

Referring to FIG. 4, a slice of the spatial distribution of the detection probability 470 of the photons in a beam, as well as the position of the single-photon detectors are shown. Depending on the type of light source used, the shape of this spatial distribution function can be Gaussian. Other shapes are also suitable. If the detectors 410, 415 are suitably located in the beam, one sees that the probability of detection of a photon can be identical for each detector. A suitable position is, for example, near the center of the beam. The randomness of the true random numbers produced in this way stems from the transverse spatial distribution of the photon detection probability in the beam.

By repeating these steps, one can produce sequences of true random numbers. Further steps process the sequence to, for example, remove a possible bias, combine true random numbers to produce numbers in a different dimension, or tailor the probability distribution, as described by J. von Neumann, "Various techniques used in connection with random digits", supra.

The apparatus is capable of generating "X-nary" random numbers, where X is the number of detectors used in the array and represents the number of dimensions each random number has. In such a case, the X-nary random number represents X-level bits in an X-dimension system. For example, symbols in a binary system can only have two meanings: traditionally referred to as "on" or "off". Thus, a binary system is an X-nary system in which X=2. For example, when the detector array consists of two single-photon detectors, the true random numbers produced are binary numbers. This detector array can also comprise more than two single-photon detectors. In an embodiment four detectors may be associated with values from 0 to 3 and produce true random numbers of dimension 4.

In another example, in the decimal system, each digit can have up to ten meanings, i.e., numbers 0 to 9. For the sake of simplicity, we would refer to this system as "ten-nary", an X-nary system in which X=10.

Another possibility is also to group the four detectors of the array into two pairs of two detectors, each pair producing one binary number.

The detector array can be placed perpendicularly to the beam. The plane of the detector array can also form an angle α different from 90 degrees with the beam propagation direction.

The detector array may be replaced by waveguides such as optical fibers (optical fiber) guiding the light to single-photon detectors.

Figure 5:
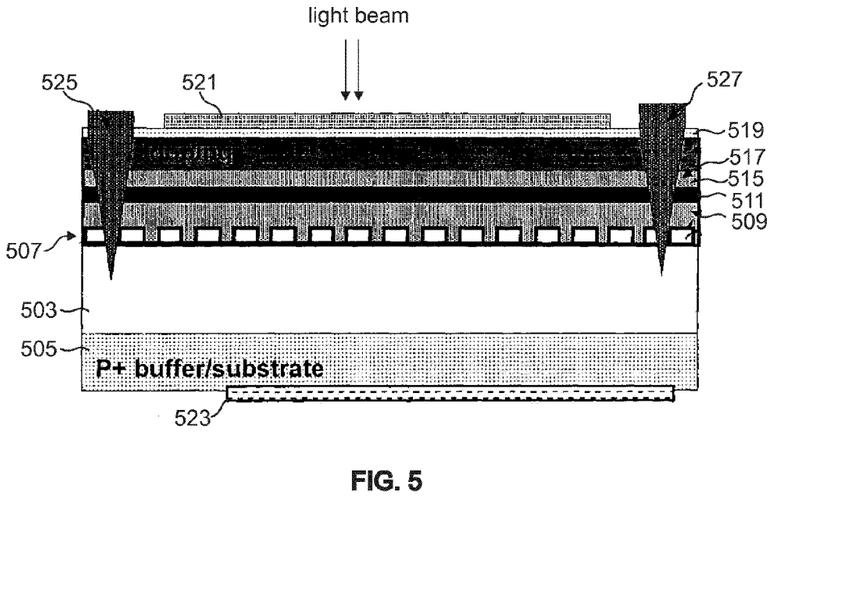
FIG. 5 shows a layer structure of a single photon detector in accordance with the present invention.

According to an embodiment, the present invention provides a photon detector as shown in FIG. 5. Hence shown is a semiconductor layer structure for a single photon detector. An absorbing barrier layer 503 is formed on an upper surface of a p+ substrate 505. A layer of quantum dots 507 is then formed on an upper surface of the absorbing layer. A first barrier layer 509 is formed on an upper surface of the layer of dots 507. A layer capable of supporting a two dimensional electron gas 511 is formed on an upper surface of the barrier layer 509, an upper barrier layer 513 is then formed on the upper surface of the 2DEG layer 511. The upper barrier layer is a modulation doped barrier layer comprising an undoped barrier layer 515 formed overlaying the 2DEG barrier layer 511 and a doped barrier layer 517 formed overlaying the undoped barrier layer 515. A capping layer 519 overlies the structure. On top of the capped layer is formed a front gate 521. This gate needs to be able to pass radiation of certain wavelengths. Typically, the gate is made from a thin layer of NiCr with a thickness of about 8 nm. The gate may also be provided by a doped semiconductor layer. A back gate contact 523 is then formed on the p+buffer/substrate layer 505. The p+back gate 505 and the front gate 521 serve as a means for applying an electric field. A source ohmic contact 525 and a drain ohmic contact 527 are made to the 2DEG 511 in the conventional manner. The back gate 505 and front gate 521 may be biased with respect to an ohmic contact 527 to the 2DEG.

The detector is configured to detect a single photon, the detector comprising first and second active layers separated by a first barrier layer, and detecting means for detecting a change in a characteristic of the first active layer, wherein the first active layer is a quantum well layer capable of supporting a two dimensional carrier gas and the second active layer comprises at least one quantum dot, the device further comprises means for separating a photo-excited electron-hole pair.

Preferably the means for separating an electron-hole pair will be provided by a means for applying an electric field normal to the active layers. However, the device may be fabricated such that the internal field of the device allows separation of photo-excited electron-hole pairs.

The device is capable of detecting a single photon. This is because optical illumination of the device leads to a change in the charge occupancy of the quantum dots and this, in turn induces a change in a transport or optical characteristic of the first active layer.

Absorption of a single photon by the device results in a change in the occupancy of a quantum dot by one carrier and this in turn induces a change in a transport or optical characteristic of the first active layer. A single photon incident on the device will photo-excite one electron-hole pair within the device. One of these photo-excited carriers is trapped by a quantum dot and induces a change in a characteristic of the first active layer. For simplicity, it will be assumed that the photo-excited hole is trapped within the quantum dot. However, it will be appreciated by those skilled in the art that the electron can be the photo-excited carrier which is trapped within the dot.

The present invention is configured to detect the presence of a single photon either by the size of the device, the total number of dots in the second active layer, the layer structure of the device or in the actual detection mechanism of the device.

Patent document GB 2 352 087 describes such a single photon detector which is cheap, compact and mechanically rugged. The detector operates using standard voltages (about or less than 5V) and can operate at low or room temperature. The full disclosure of GB 2 352 087 is hereby incorporated by reference in particular for more detailed information on the physical structure and function of the single photon detector.

The single photon detector described in GB 2 352 087 comprises first and second active layers separated by a first barrier layer. The first active layer is a quantum well layer capable of supporting a two dimensional carrier gas and the second active layer comprises at least one quantum dot. The device is capable of detecting a single photon because optical illumination of the device leads to a change in the charge occupancy of the quantum dot or quantum dots and this in turn induces a change in the transport or optical characteristics of the first active layer.

The means for applying electric fields may also comprise a p-type terminal and n-type terminal located on opposite sides of the first and second active layers. In other words, the structure is sandwiched between doped p and n-type layers.

The detector preferably comprises an anti-reflection coating provided on the surface of the device which is to be illuminated.

The energy spectrum of the quantum dots is dependent on its size, shape and local environment. Hence, different quantum dots possess different ground state energies and different optical transition energies. The device may comprise quantum dots of different sizes which require radiation of different frequencies to resonantly excite an electron-hole pair.

A convenient method of forming a layer of quantum dots is by using the Stranski-Krastanow growth mode wherein a first layer is grown on a layer with a different lattice constant to the first layer. The first layer proceeds by three dimensional island growth and small quantum dots can be produced which typically have lateral dimensions of less than 50 nm. A preferable material system for producing this device uses the growth of InAs, InGaAs or InAlAs quantum dots with GaAs or (AlGa)As barriers.

The device may be formed such that the 2DEG layer is grown before the quantum dot layer. However, the ordering may be reversed i.e. the 2DEG layer formed overlying the dot layer. Other lattice mismatched systems can be used such as InGaN or AlGaN.

Another possible system for producing the dots uses strained SiGe heterostructures.

The device may also conveniently be formed from silicon. Here, the dots would be formed from an amorphous layer of silicon which forms dots after annealing at 800°. It will also be appreciated by a man skilled in the art that germanium could also provide another possible material for fabricating the device.

Detection of single photons is also enhanced if the device further comprises an absorption layer. Such an absorption layer can be a relatively thick layer, for example greater than 100 nm, which forms a barrier layer to the quantum dots. Photons are absorbed within the absorbing layer, creating electron-hole pairs within the absorbing layer. An applied electric field, or internal electric field, within the absorbing layer separates the electron and holes which are swept in opposing directions by the field.

One polarity of carrier is swept into the quantum dot layer. Generally, the absorption layer would be provided outside the active region of the device i.e. the absorption layer would not be placed in between the first or second active layers. Such a device will generally also comprise a semiconductor substrate.

The photon detector of the present invention is not limited to a device which has just a single layer of dots. Two or more layers of dots may be provided to trap charge to affect the conductivity of the first active layer. Alternatively, a detector may comprise a plurality of first and second layers separated by a barrier. This device can be thought of as a plurality of photon detector arranged on top of one another.

A photon detector array may also be fabricated comprising a plurality of pixels, each pixel comprising a photon detector as previously hereinbefore described. Such a photon detector array may be provided with a grid of bit-lines and word-lines, wherein each pixel is addressable by applying an appropriate voltage to a word-line and/or a bit-line.

Preferably, the bit-lines and word-lines are configured to apply a control signal to the means for separating a photon-excited electron-hole pair.

For example, if the plurality of quantum dots are InAs (or AlInAs) and the first active layer is InGaAs (or GaAs), the tunnel barrier layer could be AlAs or Al(x)Ga(1−x)As (or GaAs) with a width of between 10 nm and 500 nm. More preferably between 10 nm and 200 nm.

A particularly useful example of the device is provided by a In(y)Al(1−y)As/In(x)Ga(1−x)As system. This system allows the first active layer to be fabricated from InGaAs and a barrier region, comprising an InAlAs layer provided adjacent the first active layer. The barrier region is preferably the first barrier layer. The large conduction band discontinuity between InGaAs and InAlAs allows the device to operate at much higher temperatures than those of the other systems previously referred to in this document.

The conduction band discontinuity where x=0.53 and y=0.52 has been measured between 500 and 550 meV. The system also had advantages in that it results in a low. Schottky barrier height and a high mobility.

As previously explained, the device preferably comprises an absorption layer. This absorption layer is typically provided as one of the barrier layers and is preferably provided outside the active region of the device i.e. it would not be placed between the first or second active layers. In a particularly preferred configuration, the absorption layer is provided on the opposing side of the second active layer to the first active layer and even more preferably directly in contact with the second active layer.

Single photons may be detected by measuring the current through the first active layer. Generally, a single photon absorbed by the detector will result in a stepwise rise in the current through the first active layer, although it should be noted that a stepwise decrease may also be observed in some configurations of the detector. Other parameters of the first active layer may also be measured, for example, the current may be measured in the form of conductivity. Also, the resistivity or voltage across the first active layer may be measured. Regardless of which parameter is measured, a stepwise increase or decrease in the electrical output signal should be observed as photons are absorbed by the detector.

Measurements of the detector's current may be based on a circuit device described in patent document U.S. Pat. No. 7,199,372, the description of which is incorporated herewith entirely. Hence a circuit device is provided for conditioning the output of a single photon detector, the output of said detector having a stepped electrical output signal with respect to time, the circuit comprising a band pass amplifier, said band pass amplifier having its upper 3 dB break point equal to or less than the inverse of the expected duration of the photon induced rising or falling step of said detector output.

The use of such a band pass amplifier allows conversion of the steps from the detector output into pulses which may be counted by counting electronics while still minimizing the noise from the system. The rising sides of the steps of the current signal are of primary interest. The amplifier changes these steps into pulses.

However, it will be appreciated by those skilled in the art that changes in the voltage across the first active layer could also be used. Also, it will be presumed that the detector is configured such that the current rises as photons are absorbed by the detector.

Although there is a noticeable change in the current of the device as a single photon is absorbed, the change can be very small, typically, about 2 nano Ampere (nA).

According to another preferred embodiment of the true random number generator the light source for generating the single-photon is based on a quantum dot structure. More particularly the single photon generator may comprise: an exciton generation part including therein a quantum dot having a band structure holding a single exciton; an excitation part generating a plurality of excitons, including said single exciton, in said exciton generation part; and a recombination control part controlling a recombination timing of said single exciton in said exciton generation part; wherein said recombination control part, after generation of said plurality of excitons, causes recombination of the plurality of excitons excluding the single exciton in said exciton generation part, and subsequently changes said band structure to cause recombination of said single exciton in said exciton generation part.

As a further embodiment or in addition said exciton generation part includes a type II heterojunction in said quantum dot.

As a further embodiment or in addition said quantum dot changes a composition thereof from one side of said quantum dot to another side of said quantum dot continuously.

As a further embodiment or in addition said quantum dot is formed of a quantum dot grown by a S-K mode growth process.

As a further embodiment or in addition said quantum dot is formed of a lamination of an InAs layer and a GaSb layer sandwiched between a pair of AlAs layers, said InAs layer changing a composition thereof continuously toward said GaSb layer.

As a further embodiment or in addition said recombination control part comprises an electrode provided in said exciton generation part, a voltage source applying a bias voltage to said electrode, and a switch circuit controlling application of said bias voltage from the voltage source to said electrode with a longer interval than a recombination lifetime of an exciton molecule, wherein the exciton molecule is excited simultaneously in the exciton generation part as said plurality of excitons.

As a further embodiment or in addition the single photon generator may further comprise: an optical gate member provided on a path of a single photon, the single photon is formed as a result of the recombination of said single exciton.

As a further embodiment or in addition said optical gate member is controlled by said recombination control part and passes said single photon in synchronization with the recombination of said single exciton.

U.S. Pat. No. 7,492,901 describes such a single photon generator device, the description of which is incorporated herewith entirely.

According to an exemplary embodiment a method is provided of generating a plurality of random numbers in a gaming machine, comprising: generating the plurality of random numbers from a true random number generator; sharing at least one encryption key with a remote gaming server; receiving a request from the remote gaming server for at least one set of random numbers; retrieving the at least one set of random numbers from a first memory; encrypting the at least one set of random numbers; and transmitting the encrypted set of random numbers to the remote gaming server.

As a further embodiment of the method the step of saving a copy of the transmitted set of random numbers to a second memory is provided.

As a further embodiment of the method the step of sharing further comprises forming the at least one encryption key from the plurality of random numbers.

As a further embodiment of the method the at least one encryption key is a symmetric key.

As a further embodiment of the method the at least one encryption key is a private and public key pair.

As a further embodiment of the method the said sharing further comprises generating a certificate request to a certificate authority for authorization to use the at least one encryption key.

As a further embodiment of the method the step of receiving an authorization certificate from the certificate authority is provided.

As a further embodiment of the method the transmitting further comprises encrypting the at least one set of random numbers for privacy.

As a further embodiment of the method the encrypting further comprises digitally signing the at least one set of random numbers.

As a further embodiment of the method the remote gaming server is the gaming machine.

As a further embodiment of the method the step of receiving a request to validate and audit the transmitted set of random numbers is provided.

As a further embodiment of the method the step of matching the transmitted set of random numbers with the saved copy in the second memory is provided.

As a further embodiment of the method the generating further comprises testing the plurality of random numbers to ensure randomness.

As a further embodiment of the method the step of generating a game of chance on the gaming machine with the transmitted set of random numbers is provided.

According to an exemplary embodiment a method is provided of generating a plurality of random numbers in a gaming machine, comprising: generating a plurality of random numbers from a true random number generator; removing a bias from the plurality of random numbers; testing the plurality of random numbers for non-randomness; and storing the plurality of random numbers in a memory.

As a further embodiment of the method the removing further comprises the method steps: a) pairing the plurality of random numbers; b) removing at least one common numbered pair; c) assigning a value to the remaining pairs; and d) separating the plurality of paired bits into at least one set of random numbers.

As a further embodiment of the method the testing further comprises applying at least one statistical randomness test to the plurality of random numbers.

As a further embodiment of the method the step of encrypting the plurality of random number is provided.

As a further embodiment of the method the step of digitally signing the plurality of random numbers with a private key generated from the plurality of random numbers generated by the true random number generator is provided.

As a further embodiment of the method the storing further comprises deleting older sets of random numbers if the memory is full.

As a further embodiment of the method the step of generating a game of chance to be played on the gaming machine with the plurality of random numbers is provided.

Interpretation: Unless the context requires otherwise, throughout the specification and claims which follow, the word "comprise" and variations thereof, such as, "comprises" and "comprising" are to be construed in an open, inclusive sense, that is, as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As used in this specification and the appended claims, the singular forms "a," "an," and "the" include plural referents unless the context clearly dictates otherwise. It should also be noted that the term "or" is generally employed in its sense including "and/or" unless the context clearly dictates otherwise.

The headings and Abstract of the Disclosure provided herein are for convenience only and do not interpret the scope or meaning of the embodiments.

As used herein, the expression "true random numbers" indicates random numbers generated by a physical process.

As used herein, the term "quantum well" refers to a double hetero junction structure including an ultrathin layer of a semiconductor material sandwiched by a first outer layer of a semiconductor material and a second outer layer of a semiconductor material, where the band-gap of the ultrathin layer of the semiconductor material is smaller than that of the first outer layer of the semiconductor material and the second outer layer of the semiconductor material. The sandwiched structure forms conduction band and valence band potential wells within which electrons are confined in the conduction band potential well and holes are confined in the valence band potential well, respectively. A quantum well is a potential well that confines carriers (electrons, holes, or electron-hole pairs) therein, forcing them to occupy a planar region.

The term "quantum dot", as used herein, refers to a hetero junction structure having potential wells formed such that carriers (electrons, holes, or electron-hole pairs) are confined in a small region in all three dimensions. This confinement leads to discrete quantized energy levels and to the quantization of charge in units of the elementary electric charge, "e". Because the quantum dot has discrete energy levels, much like an atom, it is sometimes called "an artificial atom". The energy levels of the quantum dot may be controlled by changing the size and shape of the quantum dot, and the depth of the potential.

As used herein, the term "superlattice" refers to a multi-layered hetero junction structure of different semiconductor materials that alternate with each other, forming multiple quantum wells therein, whose energy barriers between the adjacent quantum wells are substantially thin so that electrons can readily tunnel through (quantum mechanically penetrate) the barriers between them, the discrete energy levels broaden into miniature bands. The multilayered hetero junction structure has the energy band-gap varying with position in a desired manner. For motion perpendicular to the layer, the allowed energy levels for electrons in the conduction band, and for holes in the valence band, are discrete and well separated.

Some portions of this detailed description are presented in terms of procedures, steps, logic blocks, processing, and other symbolic representations of operations on data bits that can be performed on computer memory. Each step may be performed by hardware, software, firmware, or combinations thereof.

Any examples of a database given are thus illustrative of arrangements for the storage of information. Similarly, examples of network topology are illustrative and other topologies may be used.

It will be readily apparent to one of ordinary skill in the art that the various processes described herein may be implemented by, e.g., appropriately programmed general purpose computers, special purpose computers and computing devices. Typically a processor e.g., one or more microprocessors, one or more microcontrollers, one or more digital signal processors will receive instructions e.g., from a memory or like device, and execute those instructions, thereby performing one or more processes defined by those instructions.

A "processor" means one or more microprocessors, central processing units CPUs, computing devices, microcontrollers, digital signal processors, or like devices or any combination thereof.

Thus a description of a process is likewise a description of an apparatus for performing the process. The apparatus that performs the process can include, e.g., a processor and those input devices and output devices that are appropriate to perform the process.

Further, programs that implement such methods as well as other types of data may be stored and transmitted using a variety of media e.g., computer readable media in a number of manners. In some embodiments, hard-wired circuitry or custom hardware may be used in place of, or in combination with, some or all of the software instructions that can implement the processes of various embodiments. Thus, various combinations of hardware and software may be used instead of software only.

The term "computer-readable medium" refers to any medium, a plurality of the same, or a combination of different media, that participate in providing data e.g., instructions, data structures which may be read by a computer, a processor or a like device. Such a medium may take many forms, including but not limited to, non-volatile media, volatile media, and transmission media. Non-volatile media include, for example, optical or magnetic disks and other persistent memory. Volatile media include dynamic random access memory DRAM, which typically constitutes the main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency RF and infrared IR data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Various forms of computer readable media may be involved in carrying data e.g. sequences of instructions to a processor. For example, data may be i delivered from RAM to a processor; ii carried over a wireless transmission medium; iii formatted and/or transmitted according to numerous formats, standards or protocols, such as Ethernet or IEEE 802.3, SAP, ATP, Bluetooth•, and TCP/IP, TDMA, CDMA, and 3G; and/or iv encrypted to ensure privacy or prevent fraud in any of a variety of ways well known in the art.

Thus a description of a process is likewise a description of a computer-readable medium storing a program for performing the process. The computer-readable medium can store in any appropriate format those program elements which are appropriate to perform the method.

Another exemplary embodiment may be a program storage device readable by a computer system, the program storage device embodying a program of instructions executable by the computer system to perform a method for generating a plurality of random numbers in a gaming machine that comprises a device for generating true random numbers by way of a quantum optic process according to claim 1 or 2; the method comprising the method steps: generating the plurality of random numbers from the true random number generator; sharing at least one encryption key with a remote gaming server; receiving a request from the remote gaming server for at least one set of random numbers; retrieving the at least one set of random numbers from a first memory; encrypting the at least one set of random numbers; transmitting the encrypted set of random numbers to the remote gaming server; and saving a copy of the transmitted set of random numbers to a second memory.

Another exemplary embodiment may be a program storage device readable by a computer system, the program storage device embodying a program of instructions executable by the computer system to perform a method for generating a plurality of random numbers in a gaming machine, the method comprising: generating a plurality of random numbers from a true random number generator according to the previous embodiments; removing a bias from the plurality of random numbers; testing the plurality of random numbers for non-randomness; and storing the plurality of random numbers in a memory.

Just as the description of various steps in a process does not indicate that all the described steps are required, embodiments of an apparatus include a computer/computing device operable to perform some but not necessarily all of the described process.

Likewise, just as the description of various steps in a process does not indicate that all the described steps are required, embodiments of a computer-readable medium storing a program or data structure include a computer-readable medium storing a program that, when executed, can cause a processor to perform some but not necessarily all of the described process.

Various embodiments can be configured to work in a network environment including a computer that is in communication e.g., via a communications network with one or more devices. The computer may communicate with the devices directly or indirectly, via any wired or wireless medium e.g. the Internet, LAN, WAN or Ethernet, Token Ring, a telephone line, a cable line, a radio channel, an optical communications line, commercial on-line service providers, bulletin board systems, a satellite communications link, a combination of any of the above. Each of the devices may themselves comprise computers or other computing devices, such as those based on the Intel® Pentium® or Centrino® processor, that are adapted to communicate with the computer. Any number and type of devices may be in communication with the computer.

In one embodiment, the present invention may be practiced on a network of one or more devices without a central authority. In such an embodiment, any functions described herein as performed by the server computer or data described as stored on the server computer may instead be performed by or stored on one or more such devices.

Where a process is described, in an embodiment the process may operate without any user intervention. In another embodiment, the process includes some human intervention e.g., a step is performed by or with the assistance of a human.

While the present invention is disclosed in terms of various specific embodiments, it can be appreciated that these embodiments are by way of example only. The scope of the invention is defined by the appended claims.

The invention claimed is:

1. A device for generating true random numbers by way of a quantum optic process, the device comprising:
   a light source capable of generating a single-photon pulse series within a light beam;
   at least two detectors each for detecting single-photons within the light beam thereby providing detector signals; and
   control means configured to control the generation of the single-photon pulse series and to register the detector signals for generating true random numbers,
   wherein the detectors for detecting single-photons each comprises at least one quantum dot; and
   wherein the detectors are positioned at equivalent transverse spatial position of detection probability of single-photons in the light beam wherein the light source for generating the single-photon is based on a quantum dot structure.

2. The device as claimed in claim 1, wherein the at least two detectors comprise a semiconductor layer structure including a layer capable of supporting a two dimensional electron gas.

3. The device as claimed in claim 1, wherein light beam illumination of the detector leads to a change in a charge occupancy of the quantum dot and in turn inducing a change in a transport or optical characteristic of the detector.

4. The device as claimed in claim 1, wherein more than two detectors are arranged in an array comprising a plurality of pixels, each pixel comprising a photon detector quantum dot.

5. The device as claimed in claim 4, wherein the detector array comprises a grid of bit-lines and word-lines, wherein each pixel is addressable by applying an appropriate voltage to a word-line and/or a bit-line.

6. A device, comprising:
   a processor designed or configured to process a plurality of random numbers; and
   at least one generator for generating true random numbers as claimed in claim 1 which is coupled to the processor;
   a memory coupled to the processor to store the plurality of random numbers; and
   an input/output (I/O) interface coupled to the processor to receive and/or transmit data.

7. The device according to claim 6, providing a gaming device for playing a game of chance, comprising:
- a volatile memory coupled to the processor to store the plurality of random numbers; a non-volatile memory coupled to the processor to store at least one software program for playing the game of chance; and
- a display for displaying the game of chance.

8. A method for generating a random number, comprising the steps of:
- providing an array of at least two detectors and illuminating the array of at least two detectors with a light beam comprising a single-photon pulse series from a light source capable of generating the single-photon pulse series based on a quantum dot structure;
- detecting the single-photon pulse series using the of array least two detectors where each detector is formed by a quantum dot which is associated with a value; and
- generating the random number based on the values associated with the detector detecting the single-photon.

9. The method according to claim 8, further comprising using control circuitry for formatting random numbers associated with the detections suitable for interfacing with a computer or another device.

10. The method according to claim 9, further comprising removing a bias in a sequence of numbers so generated to produce numbers in a different dimension, or to tailor a probability distribution.

11. The method according to claim 10, further comprising queuing a sequence of random numbers so generated for randomized distribution to recipients as seeds or as cryptography keys, in a secure manner.

* * * * *

UNITED STATES PATENT AND TRADEMARK OFFICE
CERTIFICATE OF CORRECTION

PATENT NO. : 9,747,752 B2
APPLICATION NO. : 14/356401
DATED : August 29, 2017
INVENTOR(S) : Alois Homer et al.

It is certified that error appears in the above-identified patent and that said Letters Patent is hereby corrected as shown below:

In the Claims

Column 19, Lines 15-16, Claim 18:
After "single-photon pulse series using"
Delete "the of array least two" and
Insert -- the array of at least two --.

Signed and Sealed this
Fourteenth Day of November, 2017

Joseph Matal
*Performing the Functions and Duties of the
Under Secretary of Commerce for Intellectual Property and
Director of the United States Patent and Trademark Office*